United States Patent
Jones et al.

(10) Patent No.: US 11,073,630 B2
(45) Date of Patent: Jul. 27, 2021

(54) ATTENUATING TOOL BORNE NOISE ACQUIRED IN A DOWNHOLE SONIC TOOL MEASUREMENT

(71) Applicant: Schlumberger Technology Corporation, Sugar Land, TX (US)

(72) Inventors: Robert Hughes Jones, Yokohama (JP); Toshimichi Wago, Tokyo (JP); Can Evren Yarman, Cambridge (GB)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 153 days.

(21) Appl. No.: 15/607,708

(22) Filed: May 30, 2017

(65) Prior Publication Data

US 2018/0348390 A1 Dec. 6, 2018

(51) Int. Cl.
*G01V 1/30* (2006.01)
*G01V 1/48* (2006.01)

(52) U.S. Cl.
CPC ............... *G01V 1/303* (2013.01); *G01V 1/48* (2013.01); *G01V 2210/32* (2013.01)

(58) Field of Classification Search
None
See application file for complete search history.

(56) References Cited

U.S. PATENT DOCUMENTS

| | | | | |
|---|---|---|---|---|
| 5,146,433 A | * | 9/1992 | Kosmala | E21B 47/182 367/83 |
| 5,448,531 A | * | 9/1995 | Dragoset, Jr. | G01V 1/36 367/45 |
| 5,831,934 A | * | 11/1998 | Gill | G01V 1/48 367/25 |
| 5,886,303 A | * | 3/1999 | Rodney | G01V 1/46 181/102 |
| 6,671,224 B1 | | 12/2003 | Pabon | |
| 8,811,118 B2 | | 8/2014 | Reckmann | |
| 2005/0128874 A1 | * | 6/2005 | Herkenhoff | G01V 1/003 367/56 |
| 2005/0261835 A1 | | 11/2005 | Wang | |
| 2008/0259726 A1 | * | 10/2008 | van Manen | G01V 1/36 367/24 |
| 2011/0141849 A1 | * | 6/2011 | Brittan | G01V 1/364 367/43 |

(Continued)

FOREIGN PATENT DOCUMENTS

WO    2010093557 A2    8/2010

OTHER PUBLICATIONS

International Search Report and Written Opinion issued in the Related PCT application PCT/US2018/034826, dated Sep. 11, 2018 (12 pages).

(Continued)

*Primary Examiner* — Jill E Culler
(74) *Attorney, Agent, or Firm* — Eileen Pape

(57) ABSTRACT

A technique includes receiving data representing a measurement acquired by a tool motion sensor of a downhole sonic measurement tool; and receiving data representing a measurement acquired by a pressure sensor of the sonic measurement tool. The technique includes modifying the measurement acquired by the pressure sensor based at least in part on the measurement acquired by the tool motion sensor to attenuate tool borne noise.

14 Claims, 7 Drawing Sheets

(56) References Cited

U.S. PATENT DOCUMENTS

| | | | |
|---|---|---|---|
| 2013/0128696 A1* | 5/2013 | Vassallo | G01V 1/362 |
| | | | 367/43 |
| 2014/0192618 A1 | 7/2014 | Pabon | |
| 2014/0286127 A1* | 9/2014 | Goujon | G01V 1/38 |
| | | | 367/24 |
| 2015/0124562 A1 | 5/2015 | Yoneshima et al. | |
| 2015/0177404 A1 | 6/2015 | Pabon | |
| 2017/0031047 A1 | 2/2017 | Cheng et al. | |
| 2018/0003846 A1 | 1/2018 | Wago | |
| 2018/0320514 A1* | 11/2018 | Felkl | E21B 47/06 |

OTHER PUBLICATIONS

International Preliminary Report on Patentability issued in the Related PCT application PCT/US2018/034826, dated Dec. 12, 2019 (9 pages).

\* cited by examiner

ATTENUATING TOOL BORNE NOISE ACQUIRED IN A DOWNHOLE SONIC TOOL MEASUREMENT

BACKGROUND

Hydrocarbon fluids, such as oil and natural gas, are obtained from a subterranean geologic formation, referred to as a reservoir, by drilling a well that penetrates the hydrocarbon-bearing formation. During drilling and at other stages of exploration through production, various downhole tools may be used to acquire data for purpose of evaluating, analyzing, and monitoring the well bore and the surrounding geological strata. In some cases, the acquired data includes sonic or seismic data, i.e., data acquired by sensors, or receivers, in response to sonic/seismic energy interacting with the wellbore and the surrounding geological strata. The acquired data may be processed and interpreted for purposes of deriving information regarding the hydrocarbon-bearing formation, the well and other aspects pertaining to subterranean exploration.

SUMMARY

In accordance with an example implementation, a technique includes receiving data representing a measurement acquired by a tool motion sensor of a downhole sonic measurement tool; and receiving data representing a measurement acquired by a pressure sensor of the sonic measurement tool. The technique includes modifying the measurement acquired by the pressure sensor based at least in part on the measurement acquired by the tool motion sensor to attenuate tool borne noise.

In accordance with another example implementation, an apparatus that is usable within a well includes a tool body; a sonic source that is attached to the tool body; a pressure sensor and an accelerometer. The pressure sensor is attached to the tool body to sense a pressure associated with firing of the sonic source; and the accelerometer is attached to the tool body to sense a component related to the pressure sensed by the pressure sensor attributable to tool borne noise.

In accordance with another example implementation, an article includes a non-transitory computer readable storage medium to store instructions that when executed by a processor-based system cause the processor-based system to receive data representing a measurement acquired by a tool motion sensor of a downhole sonic measurement tool; receive data representing a measurement acquired by a pressure sensor of the sonic measurement tool; and modify the measurement acquired by the pressure sensor based at least in part on the measurement acquired by the tool motion sensor to attenuate tool borne noise.

In accordance with yet another example implementation, an article includes a non-transitory computer readable storage medium to store instructions that when executed by a processor-based system cause the processor-based system to receive data representing a compensating signal based on a measurement acquired by a tool motion sensor of a downhole sonic measurement tool in a test environment; receive data representing a measurement acquired by a pressure sensor of the sonic measurement tool downhole in the well; and modify the measurement acquired by the pressure sensor based at least in part on the compensating signal to attenuate tool borne noise.

Advantages and other features will become apparent from the following description, drawings and claims.

DETAILED DESCRIPTION

Figure 1:
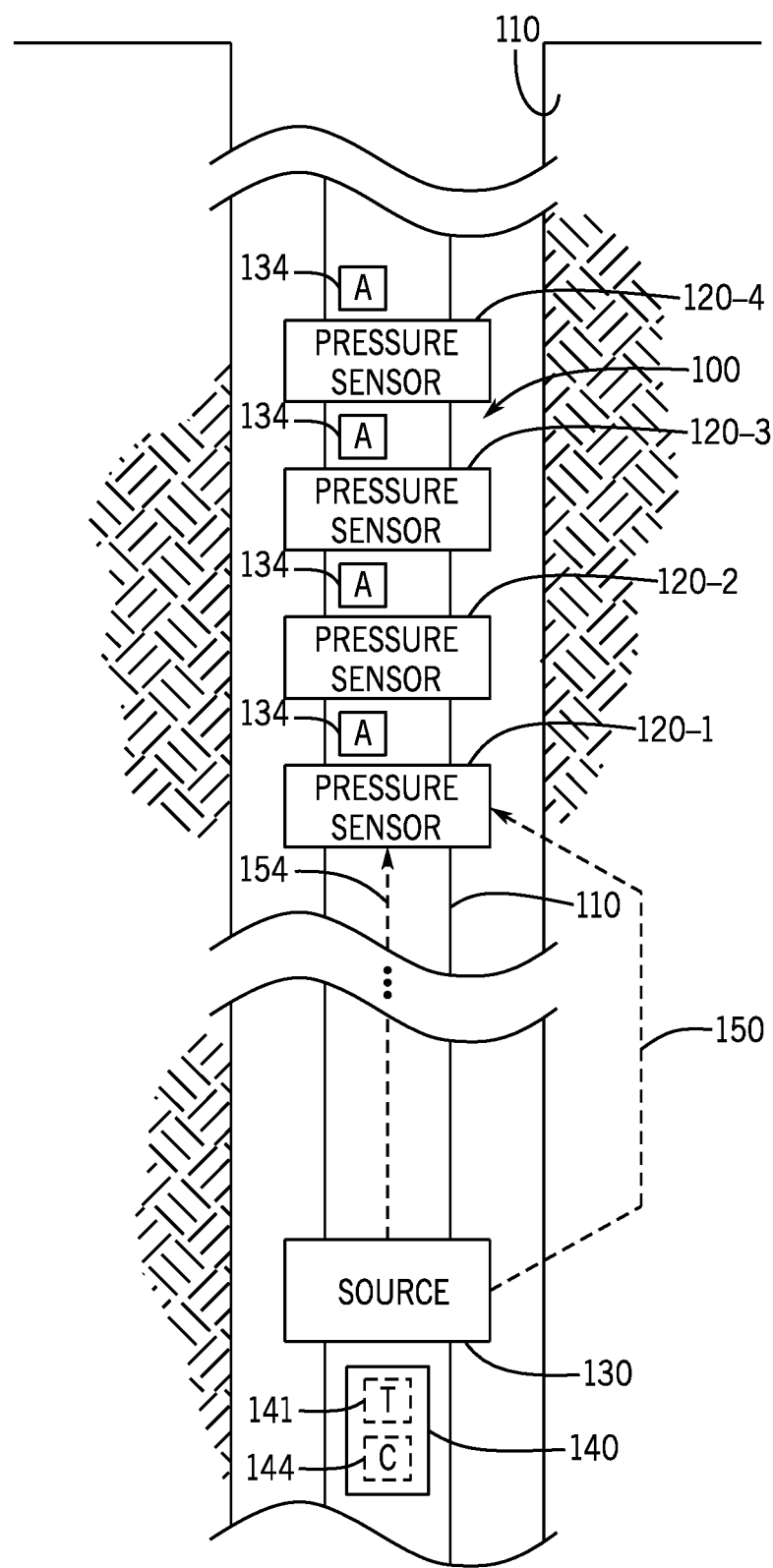
FIG. 1 is an illustration of a sonic measurement tool in a borehole according to an example implementation.

Reference throughout the specification to "one implementation," "an implementation," "some implementations," "one aspect," "an aspect," or "some aspects" means that a particular feature, structure, method, or characteristic described in connection with the implementation or aspect is included in at least one implementation of the present disclosure. Thus, the appearance of the phrases "in one implementation" or "in an implementation" or "in some implementations" in various places throughout the specification are not necessarily all referring to the same implementation. Furthermore, the particular features, structures, methods, or characteristics may be combined in any suitable manner in one or more implementations. The words "including" and "having" shall have the same meaning as the word "comprising."

As used throughout the specification and claims, the term "downhole" refers to a subterranean environment, particularly in a well or wellbore. "Downhole tool" is used broadly to mean any tool used in a subterranean environment including, but not limited to, a logging tool, an imaging tool, an acoustic tool, a permanent monitoring tool, and a combination tool.

The various techniques disclosed herein may be utilized to facilitate and improve data acquisition and analysis in downhole tools and systems. In this, downhole tools and systems are provided that utilize arrays of sensing devices that are configured or designed for attachment and detachment in downhole sensor tools or modules that are deployed for purposes of sensing data relating to environmental and tool parameters downhole, within a borehole. The tools and sensing systems disclosed herein may effectively sense and store characteristics relating to components of downhole tools as well as formation parameters at elevated temperatures and pressures. The sensing systems herein may be incorporated in tool systems such as wireline logging tools, measurement-while-drilling and logging-while-drilling tools, permanent monitoring systems, drill bits, drill collars, sondes, among others. For purposes of this disclosure, when any one of the terms wireline, cable line, slickline or coiled tubing or conveyance is used it is understood that any of the referenced deployment means, or any other suitable equivalent means, may be used with the present disclosure without departing from the spirit and scope of the present disclosure.

Moreover, inventive aspects lie in less than all features of a single disclosed implementation. Thus, the claims following the Detailed Description are hereby expressly incorporated into this Detailed Description, with each claim standing on its own as a separate implementation.

Borehole acoustic logging is a major part of subsurface formation evaluation that is key to oil and gas exploration and production. The logging may be achieved, for example, using a sonic measurement tool, which includes one or multiple acoustic transducers, or sources, and one or multiple sensors, or receivers. The sonic measurement tool may be deployed in a fluid-field wellbore for purposes of exciting and recording acoustic waveforms. The receivers thus, may acquire data representing acoustic energy that results from the acoustic energy that is emitted by the acoustic sources of the sonic measurement tool.

The acoustic propagation in the borehole is affected by the properties of rocks surrounding the wellbore. More specifically, the fluid-filled borehole supports propagation of certain number of borehole guided acoustic modes that are generated by energy from a source that is placed inside the borehole fluid. These borehole acoustic modes are characterized by their acoustic slowness (i.e., reciprocal of velocity) dispersions, which contain valuable information about the rock mechanical properties. Therefore, the acoustic logging may provide answers pertaining to such diverse applications as geophysical calibration of seismic imaging, geomechanical assessment of wellbore stability, and stress characterization for fracture stimulation. In the context of this application, "acoustic energy" refers to energy in the sonic frequency spectrum, and may be, as example, energy between 200 Hertz (Hz) and 30 kiloHertz (kHz). In addition to formation slowness, acoustic logging is used in well integrity applications to determine the cement condition between the casing and the borehole.

In general, the energy that is emitted by the sources of the sonic measurement tool may travel through rock formations as either body waves or surface waves (also called "flexural waves"). The body waves include compressional waves, or P-waves, which are waves in which small particle vibrations occur in the same direction as the direction in which the wave is traveling. The body waves may also include shear waves, or S-waves, which are waves in which particle motion occurs in a direction that is perpendicular to the direction of wave propagation. In addition to the body waves, there are a variety of borehole guided modes whose propagation characteristics can be analyzed to estimate certain rock properties of the surrounding formation. For instance, axi-symmetric Stoneley and borehole flexural waves are of particular interest in determining the formation shear slownesses. As described herein, the flexural waves may also include waves that propagate along the sonic measurement tool.

The sonic measurement tool may include multiple acoustic sources that are associated with multiple source classifications, or categories. For example, the sonic measurement tool may include one or multiple monopole sources. In response to energy from a monopole sonic source, the receivers of the sonic measurement tool may acquire data representing energy attributable to various wave modes, such as data representing P-waves, S-waves and Stoneley waves.

The sonic measurement tool may also include one or multiple directional sources, such as quadrupole sources, which produce additional borehole guided waves, which travel through the fluid in the borehole and along the sonic tool itself. Data representing these flexural waves may be processed for such purposes as determining the presence or absence of azimuthal anisotropy and/or determining a formation shear slowness.

The speeds at which the aforementioned waves travel are affected by various properties of the downhole environment, such as the rock mechanical properties, density and elastic dynamic constants, the amount and type of fluid present in the formation, the makeup of rock grains, the degree of inter-grain cementation and so forth. Therefore, by measuring the speed of acoustic wave propagation in the borehole, it is possible to characterize the surrounding formations based on sensed parameters relating to these properties. The speed, or velocity of a given sonic wave, or waveform, may be expressed in terms of the inverse of its velocity, which is referred to herein as the "slowness." In this context, an "acoustic wave" or "acoustic waveform" may refer to a particular time segment of energy recorded by one or multiple receivers and may correspond to a particular acoustic waveform mode, such as a body wave, flexural or other guided borehole waves.

Certain acoustic waves are non-dispersive, or do not significantly vary with respect to frequency. Other acoustic waves, however, are dispersive, meaning that the wave-slownesses vary as a function of frequency.

Referring to FIG. 1, in accordance with example implementations, a downhole sonic measurement tool 100 may be deployed in a wellbore 110 for purposes of acquiring acoustic measurements produced by the firing of one or multiple sonic sources of the sonic measurement tool 100. For example, the sonic measurement tool 100 may include a source 130 (a monopole, dipole and/or quadrupole sources, for example), which may be fired for purposes of producing acoustic energy that travels through the surrounding formation. The sonic measurement tool 100 may include one or multiple other sources, in accordance with example implementations. The sonic measurement tool 100 may also contain one or multiple, receivers, or sensors 120 (one or multiple pressure sensors, for example), depending on the particular implementation. Energy that is produced by the firing of a given acoustic source of the sonic measurement tool 120, such as the source 130, may be sensed by one or multiple receivers, or sensors 120 (specific sensors 120-1, 120-2, 120-3 and 120-4, being depicted in FIG. 1) for purposes of measuring the speed and amplitude of acoustic wave propagation. From the measured acoustic wave propagation, it may be possible to characterize the surrounding geologic formations.

In accordance with example implementations, the sonic measurement tool 100 may be a cement evaluation tool that is used for purposes of evaluating the cement bond between a casing (not depicted in FIG. 1) and the borehole 110. More specifically, in accordance with example implementations, the sonic measurement tool 100 may measure the pressure waveform amplitude at each sensor 120 and compare that amplitude to that of a non-cemented reference measurement (referred to as a free pipe measurement). If the cement bond is poor, the received amplitude will be similar to that of free pipe, and if the cement bond is good, the pressure wave will be highly attenuated and will have substantially lower amplitude than the free pipe.

Tool borne noise may present particular challenges in evaluating the cement bond in the above-described manner as it could arrive at approximately the same time as energy propagating through the casing. In this manner, the energy from the source 130 may propagate in two paths to each sensor 120. As specifically illustrated in FIG. 1 for the sensor 120-1, the two paths include a direct path 154 that is associated with a stronger received signal, and an indirect path 150 that is associated with energy that propagates through the formation and arrive at the sensor 120-1 at a later time. The casing wave propagation speed/slowness may be similar to the tool arrival speed, due to the casing and tool body both being made of steel, thereby presenting potential challenges in acquiring noise-free pressure amplitude measurements that are representative of the cement bond. Techniques and systems are described herein for purposes of attenuating, if not removing, the tool borne noise, even for such a challenging case.

One way to attenuate tool borne noise is through active cancellation. In this manner, an active cancelling transmitter may be built in the sonic measurement tool so that the acoustic wave that is produced by the transmitter constructively interferes with the tool body acoustic wave. The use of this active cancellation approach, however, may present several challenges. For example, with this approach, an extra transmitter is added to the tool, thereby increasing the expense, consuming energy and affecting overall reliability of the tool. With active cancellation, both sources are fired simultaneously or near simultaneously, thereby requiring a relatively high degree of timing accuracy (a timing accuracy less than 1 microsecond (μs), for example). To achieve sufficient constructive interference, active cancellation uses a relatively complex firing waveform. The cancelled waveform may therefore, be a high voltage, complex waveform and moreover, the waveform may vary with tool position, well condition and potentially other factors.

In accordance with example implementations that are described herein, tool borne noise is passively attenuated from measured pressure signals, or traces, using signal processing instead of using active noise attenuation or using an attenuator. In this context, "attenuating" tool borne noise refers to removing, or eliminating, at least part (if not all) of the tool borne noise. More specifically, in accordance with example implementations, the sonic measurement tool 100 includes one or multiple tool motion sensors, such as one or multiple accelerometers 134, depending on the particular implementation. As described herein, in accordance with example implementations, the accelerometer 134 acquires a measurement, which represents the motion of the body of the sonic measurement tool 100 in response to the firing of an acoustic source, such as the source 130. The measurement by the accelerometer 134, in turn, is decoupled from the well fluid and formation; and as such, the measurement may be considered to be closely related to the tool borne noise. Therefore, based at least in part on measurements acquired by one or multiple such accelerometers 134, the tool borne noise may be estimated and removed from the pressure measurements.

As a more specific example, in accordance with some implementations, each pressure sensor 120 may have an associated accelerometer 134 that is located near or at the pressure sensor 120. For example, in accordance with some implementations, a given pressure sensor 120 may have an associated accelerometer 134 that is located within one meter of the pressure sensor 120. The accelerometers 134 may or may not be disposed inside a pressure sealed chamber 140, which houses electronics (such as a telemetry circuit 141 and a controller 144, for example) of the sonic measurement tool 100, depending on the particular implementation. In accordance with example implementations, the accelerometers 134 are coupled to the tool body (such as coupled to the collar of the tool 100, for example) and are not coupled to the well fluid.

Moreover, unlike conventional arrangements, the accelerometer 134 is constructed to sense energy in a frequency spectrum that is associated with the sonic pressure measurement. For example, in accordance with some implementations, the accelerometer 134 may be sensitive to energy in a range from 1 to 150 kHz or above, for example. Moreover, in accordance with example implementations, the accelerometer 134 may have one or multiple sensitive axes of measurement. For example, in accordance with some implementations, the accelerometer 134 may have a sensitive axis that is aligned with the tool's longitudinal axis to sense acceleration along this axis. In accordance with example implementations, the accelerometer 134 may have multiple sensitive axes and accordingly, the accelerometers 134 may measure accelerations along multiple orthogonal axes (along three orthogonal axes, for example).

Although accelerometers are described herein as a specific example of tool motion sensors, other sensors may be used, in accordance with further example implementations. For example, in accordance with some implementations, the sonic measurement tool may include velocity sensors, which acquire data representing a sensed velocity of the body of the sonic measurement tool.

Figure 2A:
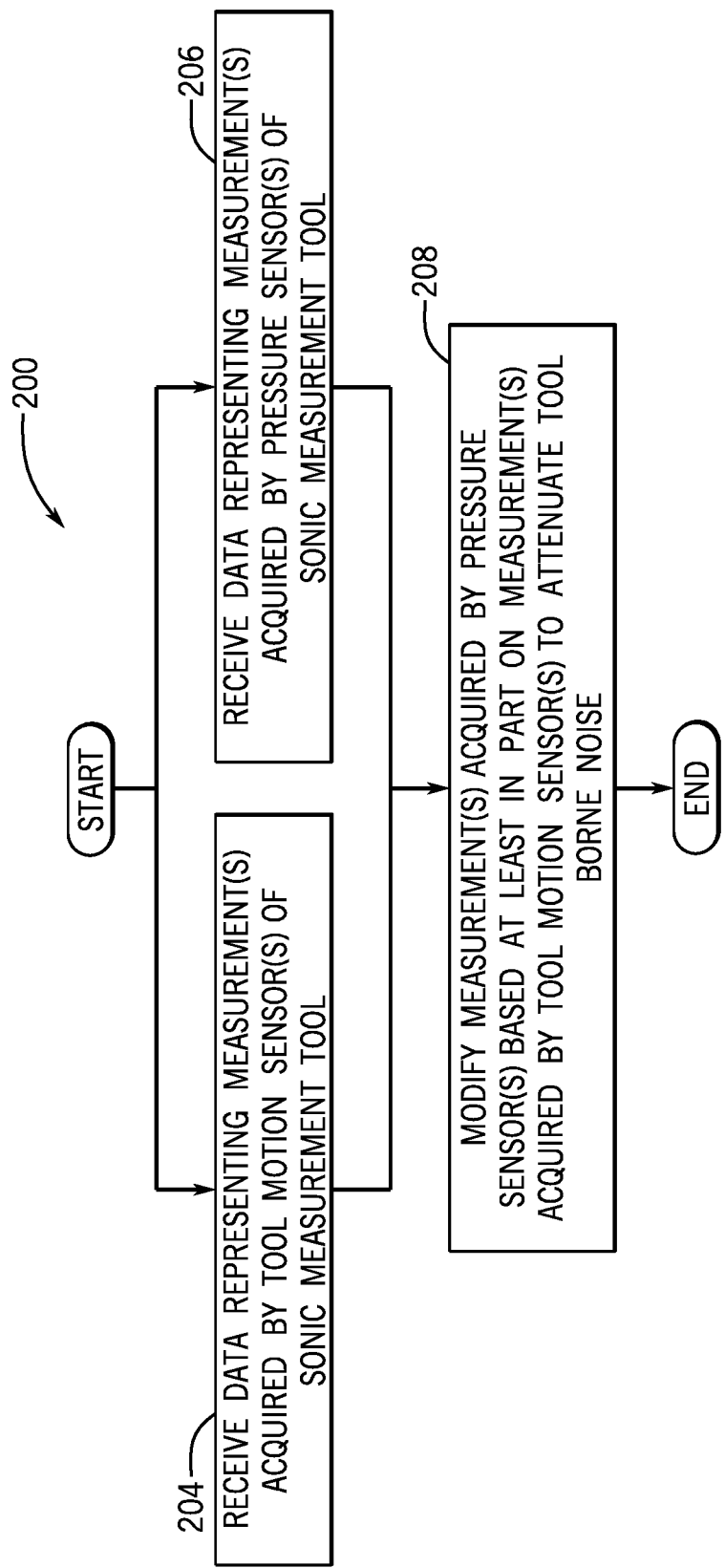
FIGS. 2A, 2B and 2C are flow diagrams depicting techniques to compensate measurements acquired by a downhole sonic measurement tool to attenuate tool borne noise according to example implementations.

Thus, referring to FIG. 2A in conjunction with FIG. 1, in accordance with some implementations, a technique 200 includes receiving (block 204) data representing one or multiple measurements that are acquired by one or multiple tool motion sensors of a downhole sonic measurement tool and receiving (block 206) data representing one or multiple measurements acquired by one or multiple pressure sensors of the sonic measurement tool. The measurement(s) acquired by the pressure sensor(s) may be modified, pursuant to block 208, based at least in part on the measurement(s) acquired by the tool motion sensor(s) to attenuate tool borne noise.

Figure 3:
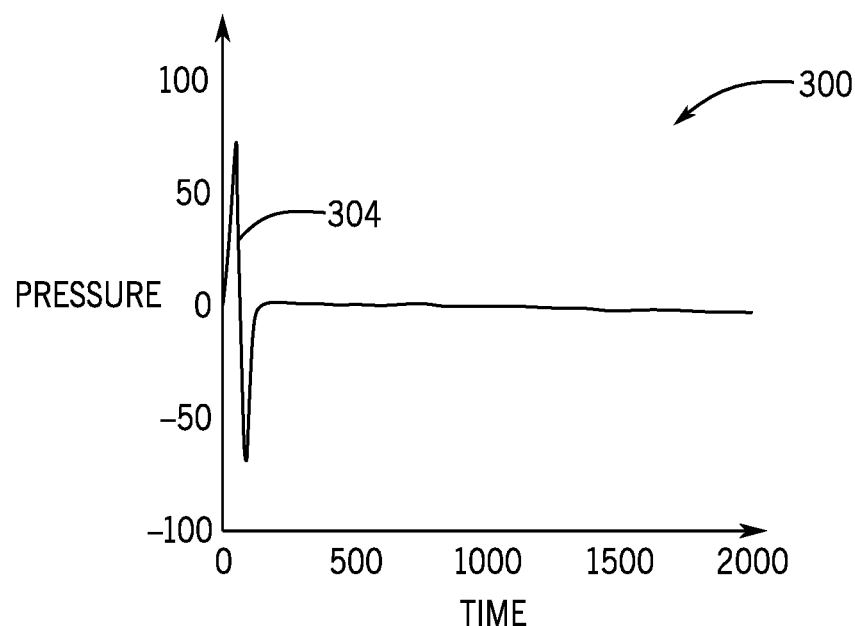
FIG. 3 is an illustration of a pressure versus time waveform produced by the firing of a source of the sonic measurement tool according to an example implementation.
Figure 4:
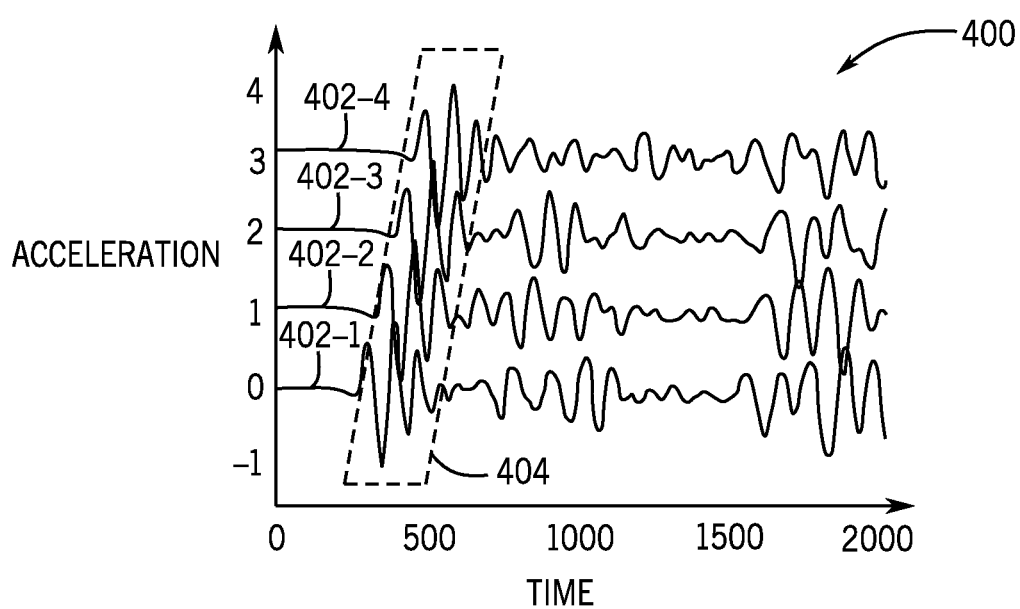
FIG. 4 illustrates acceleration versus time waveforms sensed by accelerometers of the sonic measurement tool in response to the firing of the source according to an example implementation.

FIGS. 3, 4, 5 and 6 illustrate attenuation of tool borne noise in accordance with example implementations. Referring to FIG. 3 in conjunction with FIG. 1, the acoustic source 130 may be fired, resulting in emitted energy, as depicted at reference numeral 304 in a pressure versus time waveform 300 for the source 130. The firing of the acoustic source 130 produces energy that propagates through the tool body and arrives at the accelerometers 134, as depicted in FIG. 4. In this manner, referring to FIG. 4 in conjunction with FIG. 1, the accelerometers 134-1, 134-2, 134-3, and 134-4 sense energy 404 that directly propagates from the source 130 to produce corresponding sensed acceleration signals 402-1, 402-2, 402-3 and 404-4, respectively.

Figure 5:
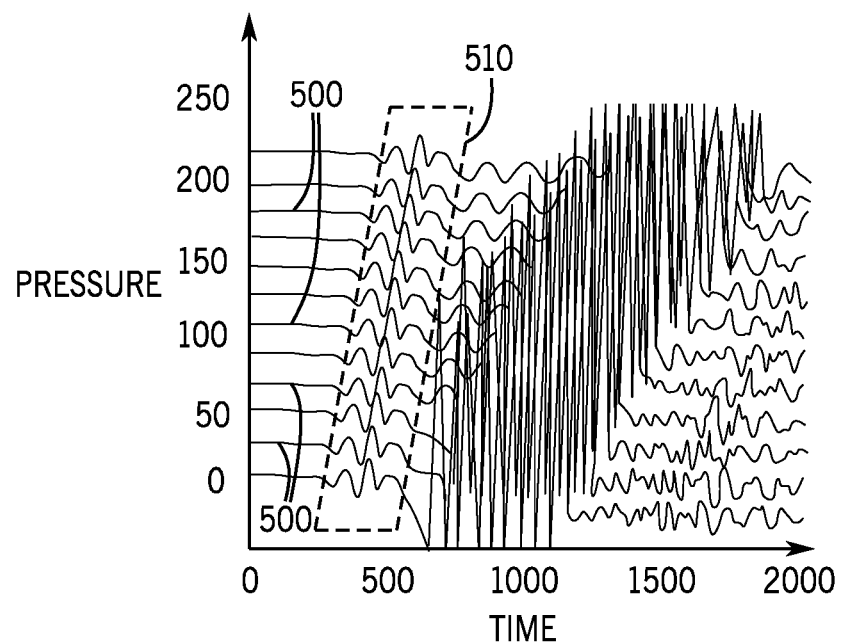
FIG. 5 illustrates pressure versus time waveforms sensed by pressure sensors of the sonic measurement tool in response to the firing of the source according to an example implementation.

The tool borne energy directly propagating from the acoustic source 134, in turn, combines with the energy propagating through the fluid and formation to result in composite pressure versus time waveforms 500 that are sensed by the sensors 120, as illustrated in FIG. 5. In this manner, referring to FIG. 5 in conjunction with FIG. 1, a time window 510 of the pressure versus time waveforms 500 is attributable to the tool borne noise.

Figure 6:
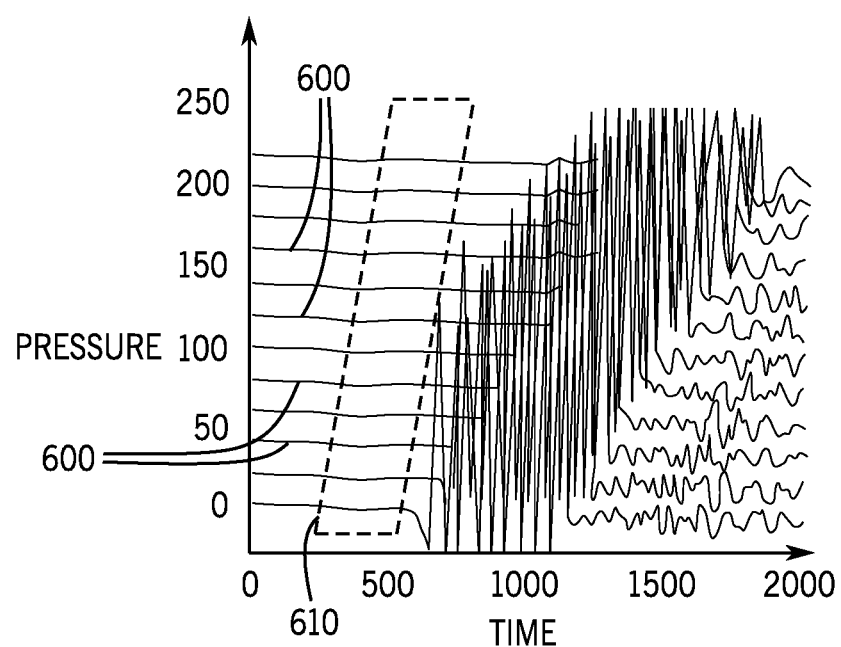
FIG. 6 illustrates pressure versus time waveforms produced by applying compensation to the pressure versus time waveforms of FIG. 5 to remove tool borne noise according to an example implementation.

In accordance with example portions of the sensed pressures, which are attributable to the tool borne noise, are identified and removed. For example, in accordance with some implementations, the signals that are provided by the accelerometers 134 may be time integrated to derive corresponding tool body velocity versus time profiles. From these velocity versus time profiles, the arrival time of the energy that propagates through the tool body may be estimated to correspondingly identify the time segments of the sensed pressure versus time waveforms, which are associated with the tool borne noise. As such, as illustrated in FIG. 5, the time window 510 may be identified so that the sensed pressures within the time window 510 subtracted from the pressure signals to derive compensated pressure signal 610 that are illustrated in FIG. 6. Thus, as depicted in FIG. 6, tool borne noise has been substantially removed, if not eliminated, in a corresponding time window 610 of the pressure signal 600.

Figure 2B:
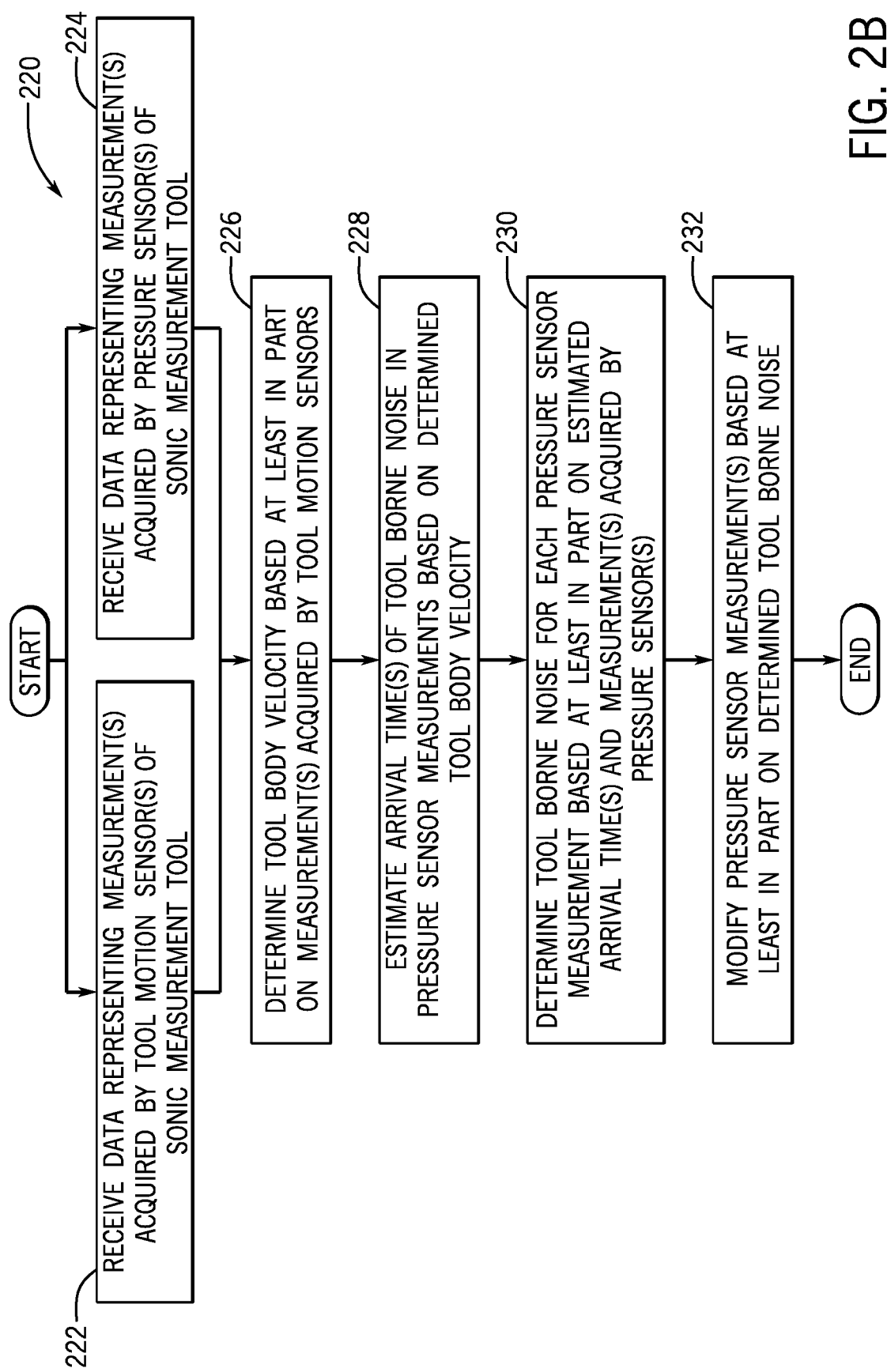

Thus, referring to FIG. 2B, in accordance with example implementations, a technique 220 includes receiving (block 222) data representing one or multiple measurements that are acquired by one or multiple tool motion sensors of a sonic measurement tool and receiving (block 224) data representing one or multiple measurements acquired by one or multiple pressure sensors of the sonic measurement tool. The tool body velocity may then be determined, pursuant to block 226, based at least in part on the measurement(s) acquired by the tool motion sensor(s). In this manner, the tool motion sensors may be accelerometers, and determining the tool body velocity may involve time integrating the accelerations sent by the accelerometers.

The technique 220 includes estimating (block 228) the arrival time(s) of the tool borne noise in the pressure sensor measurement(s) based on the determined tool body velocity. The tool borne noise may then be determined, pursuant to block 230, for each pressure sensor measurement based at least in part on the estimated arrival time(s) and the measurement(s) acquired by the pressure sensor(s). The pressure sensor measurement(s) may then be modified (block 232) based at least in part on the determined tool borne noise.

In accordance with further example implementations, a tool-borne noise compensating signal that is applied to the pressure amplitude that is sensed by a given pressure sensor of the sonic measurement tool may be pre-determined based on measurements that are acquired in a test environment (measurements made by placing the sonic measurement tool in a water pit, for example). More specifically, in accordance with example implementations, the sonic measurement tool receives data representing a compensating signal, which was constructed based on a measurement acquired by a tool motion sensor of the sonic measurement tool downhole sonic measurement tool in a test environment. The test environment can be a test well, water pit, or the like. For example, the measurement can be taken in a test well, in which the borehole diameter is large that the tool, such that the tool and formation arrival are well separated in time and slowness thus having a "clean" tool-borne-noise signature that can be used as calibration.

Downhole in the well, the sonic measurement tool receives data representing a measurement acquired by a pressure sensor of the sonic measurement tool; and the tool modifies the measurement acquired by the pressure sensor based at least in part on the compensating signal to attenuate tool borne noise.

In accordance with further example implementations, a more robust, baseline technique may be used to attenuate tool borne noise. In this manner, through the duration of a job in which the sonic measurement tool is moved to different downhole locations and used to acquire measurements at these locations, the arrival time and signature of the tool borne noise remain relatively constant in the sensed accelerations, whereas the energy path experienced by the indirectly propagating energy from the acoustic source varies. In this regard, at the different downhole locations of the sonic measurement tool, the energy propagating from the acoustic source may experience different mud types, formation types, borehole sizes, and so forth. Based on this premise, the tool borne noise may be characterized with more "conditions," and the noise may be eliminated with more accuracy, as compared to, for example, estimating the tool borne noise from a single firing for a particular depth of the sonic measurement tool.

Figure 2C:
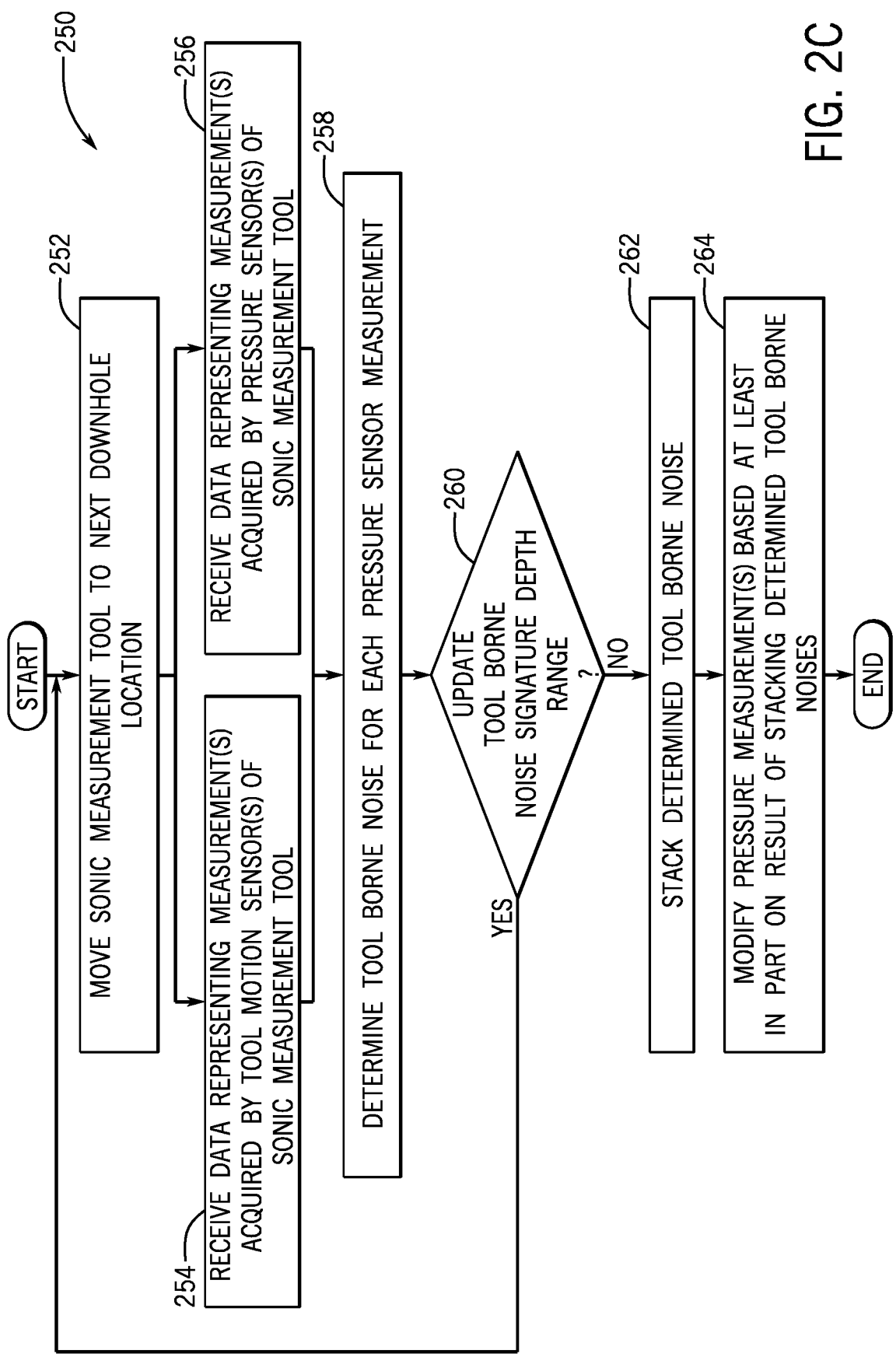

Referring to FIG. 2C, in accordance with example implementations, a technique 250 includes moving (block 252) a sonic measurement tool downhole to the next downhole location at which pressure measurements are to be acquired. Pursuant to the technique 250, data representing one or multiple measurements acquired by one or multiple tool motion sensors of the sonic measurement tool are received (block 254), as well as data representing one or multiple measurement(s) acquired by one or multiple pressure sensors of the sonic measurement tool (block 256). According to the technique 250, a tool borne noise is then determined, pursuant to block 258, for each pressure sensor measurement. In response to determining (decision block 260) that an update to the tool borne noise signature depth range is to be made, the sonic measurement tool is moved (block 252) and blocks 254, 256 and 258 are repeated. Once all the measurements have been acquired, the technique 250 includes averaging, or stacking, the determined tool borne noises, pursuant to block 262. In this manner, the stacking averages out the varying conditions experienced by energy propagating through the fluid and surrounding formations at the different measurement locations of the tool 100. Accordingly, the pressure measurement(s) may then be compensated, pursuant to block 264, based at least in part on the result of the stacking of the tool borne noises.

Figure 7:
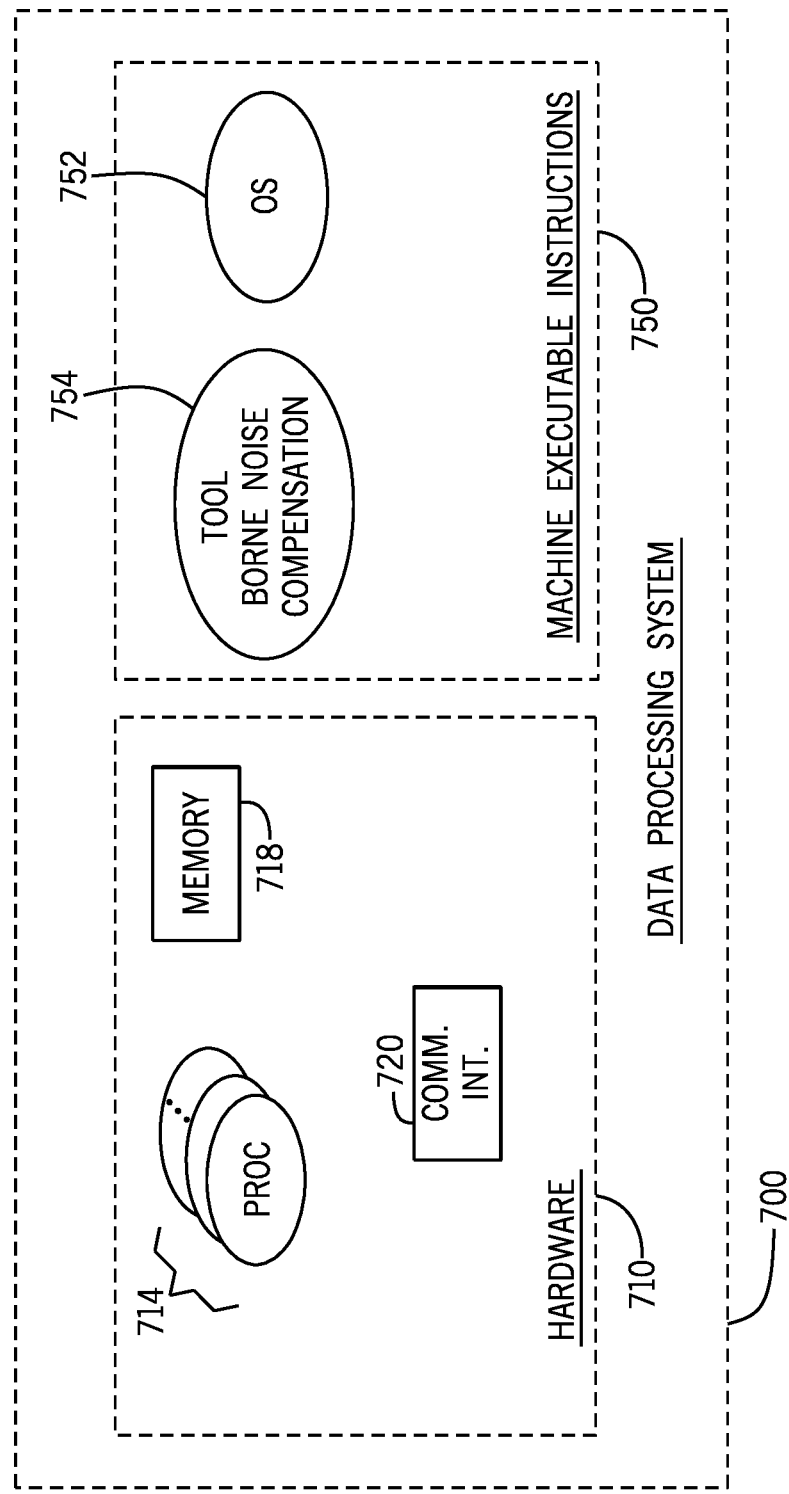
FIG. 7 is a schematic diagram of a data processing system according to an example implementation.

Referring to FIG. 7, in accordance with some implementations, a data processing system 700 may be used for purposes of determining/identifying tool borne noise and compensating pressure measurements to attenuate the tool borne noise, as described herein. Depending on the particular implementation, the data processing system 700 may be part of the sonic measurement tool (part of the controller 144 of the tool 100, as depicted in FIG. 1), may be part of an Earth-disposed processing system, may be part of a processing system disposed remotely from the well, and so forth, depending on the particular implementation.

In general, the data processing system 700 may be a processor-based architecture that is formed from one or multiple actual physical machines that are made up of actual hardware 710 and machine executable instructions 750, or "software."

In accordance with some implementations, the hardware 710 may include one or multiple processors 714 (one or multiple central processing units (CPUs), one or multiple CPU processing cores, and so forth). The hardware 710 may further include a memory 718, which may, for example, contain data representing acceleration measurements acquired by accelerometers of the sonic measurement tool, data representing measurements acquired by other tool motion sensors of the sonic measurement tool, data representing pressure measurements acquired by the pressure sensors of the sonic measurement tool, parameters related to techniques to model the tool borne noise as a function of sensed acceleration, and so forth. The memory 718 may further store executable instructions that, when executed by the processor(s) 714, cause the processor(s) 714 to perform some or all of one or more of the techniques that are described herein.

In general, the memory 718 is a non-transitory memory that may be formed from, as examples, semiconductor storage devices, memristors, magnetic storage devices, phase change memory devices, a combination of one or more of these storage technologies, and so forth, depending on the particular implementation.

In accordance with example implementations, the hardware 710 of the data processing system 700 may include various other components, such as one or multiple telemetry interfaces 720 (that communicate with the telemetry interface 141 of the tool 100, for example), a display and so forth. In accordance with some implementations, the display may display pressure measurements, tool borne noise-compensated pressure measurements, acceleration measurements, and so forth.

In accordance with some implementations, the machine executable instructions 750 may include, for example, instructions 754 that when executed by the processor(s) 714 may cause the processor(s) 714 to form a tool borne noise compensation engine that performs time integration of acceleration measurements, tool arrival estimation, transformation of sensed acceleration into tool borne noise compensations for pressure signals, attenuation of tool borne measurements to derive compensated pressure measurements, and so forth, as described herein. In accordance with some implementations, the instructions 754, when executed by the processor(s) 714 may cause the processor(s) 714 to form a tool borne compensation to apply a tool borne noise compensation signal that was derived from measurement(s) acquired in the test environment, as described herein. Moreover, in accordance with example implementations, the machine executable instructions 750 may include one or multiple other sets of instructions to form various other components of the data processing system 700, such as, for example, a set 758 of instructions that when executed cause the processor(s) 714 to form an operating system.

In accordance with further example implementations, all or part of the above-described processor-based architecture may be replaced by dedicated, hardwired circuitry or by an application specific integrated circuit (ASIC). Thus, many implementations are contemplated, which are within the scope of the appended claims.

Although only a few example implementations have been described in detail above, those skilled in the art will readily appreciate that many modifications are possible in the example implementations without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method comprising:
    receiving data representing a measurement acquired by a pressure sensor of a downhole sonic measurement tool;
    receiving data representing a measurement acquired by a tool motion sensor of the downhole sonic measurement tool; and
    determining a velocity of the downhole sonic measurement tool based at least in part on the measurement acquired by the tool motion sensor;
    estimating an arrival time of tool borne noise in the measurement acquired by the pressure sensor based on the velocity of the downhole sonic measurement tool;
    determining tool borne noise for the measurement acquired by the pressure sensor based at least in part on the estimated arrival time and the measurement acquired by the pressure sensor;
    modifying the measurement acquired by the pressure sensor based at least in part on the tool borne noise;
    wherein the tool motion sensor comprises an accelerometer disposed proximate the pressure sensor and provides an acceleration signal.

2. The method of claim 1, wherein the tool borne noise comprises noise attributable to energy from a source of the downhole sonic measurement tool propagating through a body of the downhole sonic measurement tool.

3. The method of claim 1, wherein receiving data acquired by the tool motion sensor comprises receiving data acquired by a sensor disposed outside of a pressure sealed chamber in which electronics of the downhole sonic measurement tool are disposed.

4. The method of claim 1, wherein receiving the data representing the measurement acquired by the pressure sensor comprises receiving data representing movement of the downhole sonic measurement tool in response to energy produced by firing of a source of the sonic measurement tool.

5. The method of claim 1, wherein receiving data representing the measurement acquired by the tool motion sensor comprises receiving data representing energy sensed by the tool motion sensor in a frequency range of 1 to up to 150 kiloHertz.

6. The method of claim 1, wherein compensating the measurement acquired by the pressure sensor comprises determining a velocity of energy propagating along a tool body of the downhole sonic measurement tool from a sonic source of the downhole sonic tool and based on the identified velocity of energy, identifying a time segment of a pressure versus time profile associated with the tool borne noise.

7. The method of claim 1, wherein compensating the measurement acquired by the pressure sensor comprises:
    moving the sonic measurement tool to a downhole position;
    acquiring the measurement of the tool motion sensor when the sonic measurement tool is at the given downhole position;
    acquiring the measurement by the pressure sensor when the sonic measurement tool is at the given downhole location;
    repeating acquiring the measurements of the tool motion and pressure at one or more other downhole locations of the sonic measurement tool; and
    determining the tool borne noise based at least in part on results of the measurements of the pressure and the tool motion at the locations of the sonic measurement tool.

8. The method of claim 7, wherein determining the tool borne noise based on the measurements of pressure and tool motion at the downhole locations of the sonic measurement tool comprises stacking estimated tool borne noises derived from the measurements of pressure and tool motion at each of the downhole locations.

9. The method of claim 8, wherein the stacking relies on differences in the formation or well properties affecting propagation of energy from the sonic source through well fluid or through a formation.

10. An article comprising non-transitory computer readable storage medium to store instructions that when executed by a processor-based system cause the processor-based system to:
receive data representing a measurement acquired by a pressure sensor of a downhole sonic measurement tool;
receive data representing a measurement acquired by a tool motion sensor of the downhole sonic measurement tool;
determine a velocity of the downhole sonic measurement tool based at least in part on the measurement acquired by the tool motion sensor;
estimate an arrival time of tool borne noise in the measurement acquired by the pressure sensor based on the velocity of the downhole sonic measurement tool;
determine tool borne noise for the measurement acquired by the pressure sensor based at least in part on the estimated arrival time and the measurement acquired by the pressure sensor; and
modify the measurement acquired by the pressure sensor based at least in part on the measurement acquired by the tool motion sensor to attenuate tool borne noise;
wherein the tool motion sensor comprises an accelerometer disposed proximate the pressure sensor.

11. The article of claim 10, wherein the tool borne noise comprises noise attributable to energy from a source of the downhole sonic measurement tool propagating through a body of the downhole sonic measurement tool.

12. The article of claim 10, the computer readable storage medium storing instructions that when executed by the processor-based system cause the processor-based system to receive data acquired by a sensor disposed outside of a pressure sealed chamber in which electronics of the downhole sonic measurement tool are disposed.

13. The article of claim 10, the computer readable storage medium storing instructions that when executed by the processor-based system cause the processor-based system to receive data representing movement of the sonic measurement tool in response to energy produced by firing of a source of the downhole sonic measurement tool.

14. An article comprising non-transitory computer readable storage medium to store instructions that when executed by a processor-based system cause the processor-based system to:
receive data representing a measurement acquired by a pressure sensor of a downhole sonic measurement tool downhole in the well;
receive data representing a compensating signal based on a measurement acquired by a tool motion sensor of a downhole sonic measurement tool in a test environment;
determine a velocity of the downhole sonic measurement tool based at least in part on the measurement acquired by the tool motion sensor;
estimate an arrival time of tool borne noise in the measurement acquired by the pressure sensor based on the velocity of the downhole sonic measurement tool;
determine tool borne noise for the measurement acquired by the pressure sensor based at least in part on the estimated arrival time and the measurement acquired by the pressure sensor; and
modify the measurement acquired by the pressure sensor based at least in part on the compensating signal to attenuate tool borne noise;
wherein the tool motion sensor comprises an accelerometer disposed proximate the pressure sensor.

* * * * *